United States Patent [19]

Gergele

[11] Patent Number: 5,232,034

[45] Date of Patent: Aug. 3, 1993

[54] ROLLING ASSEMBLY FOR A TIRE HAVING BEADS WITH FRUSTOCONICAL BASES WHICH ASSEMBLY INCLUDES A MOUNTING RIM WITH FLAT SEATS AND ANNULAR ADAPTERS

[75] Inventor: Jean Gergele, Chatel-Guyon, France

[73] Assignee: Compagnie Generale des Etablissements Michelin-Michelin & Cie, Clermont-Ferrand, France

[21] Appl. No.: 838,283

[22] PCT Filed: Jul. 12, 1991

[86] PCT No.: PCT/FR91/00570

§ 371 Date: Mar. 5, 1992

§ 102(e) Date: Mar. 5, 1992

[87] PCT Pub. No.: WO92/01577

PCT Pub. Date: Feb. 6, 1992

[30] Foreign Application Priority Data

Jul. 17, 1990 [FR] France .................. 90 09213

[51] Int. Cl.$^5$ ............................................. B60C 15/02
[52] U.S. Cl. .............................. 152/394; 152/379.4; 152/381.4
[58] Field of Search ................... 301/95–98; 152/375, 379.3, 379.4, 379.5, 381.4, 391, 384, 393, 394

[56] References Cited

U.S. PATENT DOCUMENTS

| | | | |
|---|---|---|---|
| 4,373,567 | 2/1983 | Declercq | 152/405 |
| 4,422,490 | 12/1983 | Power | 301/63 DS X |
| 4,658,876 | 4/1987 | Augier | 152/394 |

FOREIGN PATENT DOCUMENTS

| | | |
|---|---|---|
| 2452306 | 5/1976 | Fed. Rep. of Germany . |
| 2456419 | 8/1976 | Fed. Rep. of Germany ... 152/381.3 |
| 2414883 | 10/1976 | Fed. Rep. of Germany ... 152/379.3 |
| 60-99047 | 11/1986 | Japan . |

*Primary Examiner*—Russell D. Stormer
*Attorney, Agent, or Firm*—Brumbaugh, Graves, Donohue & Raymond

[57] ABSTRACT

In order to be able to increase the diameter of the standard rim (J') of a tire (P) without independent inner tube, which is provided with beads the seats of which are frustoconical and is normally used on this standard rim (J') having a mounting groove, the tire (P) is mounted on the rim (J) having a cylindrical rim base without mounting groove and the diameter ($\phi_{JS}$) of which is greater than the diameter of the mounting groove of the rim (J') by means of two adapters ($S_1$, $S_2$) of compression-resistant vulcanized rubber reinforced by meridian and circumferential elements.

10 Claims, 3 Drawing Sheets ically in the ce<br>
ROLLING ASSEMBLY FOR A TIRE HAVING BEADS WITH FRUSTOCONICAL BASES WHICH ASSEMBLY INCLUDES A MOUNTING RIM WITH FLAT SEATS AND ANNULAR ADAPTERS

BACKGROUND OF THE INVENTION

The present invention relates to a rolling assembly formed of a tire, a rim, and annular elements, known as tire-rim adapters, mounted between the beads of the tire and the rim.

In order to avoid the possible handling of a large number of metal parts in mounting a "heavy-vehicle flat-seat" tire on its service rim, rolling assemblies have been proposed which comprise, on the one hand, a monoblock rim, in particular a "15° seat" rim and, on the other hand, a tire the beads of which have seats inclined by a angle generally greater than 15° with respect to the axis of rotation of the tire.

These rolling assemblies have great advantages. The danger of the throwing off of metal parts being eliminated, greater safety is assured; the tires used being tubeless tires, the absence of a tube and flap results in substantial savings while avoiding rubbing between tube and tire and thus heating and blowout of the inner tube. The ease of mounting and removal is increased and the balancing of the rotating assembly is improved by the elimination of the imbalances due to the tube, flap and mounting rings.

The rims with inclined seats of 15° have a mounting groove in their central part. The radially inner diameter of this groove is a major obstacle to the selection of the brake drums or calipers of disc brakes of larger diameter, which would permit greater braking efficiency. Furthermore, due to the presence of the central groove, the manufacture of a rim with inclined seats requires particular care in order to avoid problems of fatigue of the metal forming it.

Although the assemblies consisting of 15° seat rim and corresponding tire are most widely used, it is to be noted that there are also rims with frustoconical seats inclined at an angle of 5° which have the same advantages and are subject to the same drawbacks.

SUMMARY OF THE INVENTION

In order to remedy the drawbacks mentioned while retaining the advantages obtained by the use of a rolling assembly formed of a rim with inclined seats and of the tire with frustoconical bead bases which is intended to be mounted on said rim, the invention proposes a rolling assembly composed of the tire itself, mounted by means of annular adapters on a single-piece rim the base of which is parallel to the axis of rotation and the rim flanges of which are fixed. As the annular adapters of the assembly have a radially outer face which is different from the radially inner face, and in order to avoid deformation of the vulcanized rubber forming the adapter as a result of the intense compressive forces which it must experience both in statics and in dynamics, it is necessary to reinforce these adapters meridionally and circumferentially.

In accordance with the invention, the rolling assembly formed of a tire P, a rim J and two independent annular adapters $S_1$, $S_2$ inserted between the beads of the tire P and the rim J, the tire P being a tire of standard size without independent inner tube, intended for use on a standard rim J' having frustoconical seats and rim flanges of height H, is characterized by the fact that
 - the service rim J, intended to receive the adapters $S_1$, $S_2$, has no mounting groove and formed primarily of two rim flanges of height H and a cylindrical rim base the diameter $\phi_{JS}$ of which is such that $$\sqrt{(\phi_{JS} + H)^2 + K^2} < \phi_{SE}$$

$\phi_{SE}$ being the nominal diameter of the rim J' normally used for the tire P and K being the axial distance between the top of the rim flange and the end of the cylindrical rim base, while the width W of the rim J is between 1.05 and 1.10 times the width A of the rim J', and,
 - by the fact that each adapter $S_1$, $S_2$ has an outer contour adapted, on the one hand, to the contour of the rim J on which it rests and, on the other hand, to the contour of the bead of the known tire P and is formed of a vulcanized elastomeric material C of an elastic modulus of compression at least equal to 8 MPa, which material is surrounded by a reinforcement formed of at least one ply of meridian cords or cables and reinforced by a mass of nonextendable circumferentially arranged cords or cables, this mass, in the form of superimposed strips or "package" rings, being located between the two quasivertical faces of the adapter $S_1$, $S_2$.

Cords or cables which, under a load equal to 10% of the rupture load of the cord or cable, have a relative elongation of less than 0.5% are referred to as nonextensible.

The use of such a rolling assembly makes possible not only the solution of the problem which forms the base of the invention but also has a surprising advantage. In fact, although the rim seats are brought nearer to the braking system and the rim transmits more heat to the elastomeric adapter/tire bead assembly, the beads of the tire, however, are intact after travel both from the standpoint of degradation of the rubber by heat and from the standpoint of wear by rubbing.

In order to assure an effective placing of the adapters on the rim, the service rim has rim flanges similar to the flanges of the standard rim normally used for the tire in question, these rim flanges being connected to the cylindrical rim base by portions in the shape of a circular arc the radius of which is equal to the radius of the connecting portions used on the rim normally employed.

The radially outer profile of an adapter, seen in meridian section, is preferably strictly identical to the profile of the meridian section of the flange-seat assembly of the standard inclined seat rim on which the tire used is normally mounted. In particular, the inclined seat of the frustoconical adapter advantageously has generatrices forming angles of 15°±1° with the axis of rotation.

As to the radially inner profile of the adapter, seen in meridian section, it is adapted to the profile of the flat base rim in accordance with the invention and is formed essentially of a linear part which forms an angle of between 0° and 10° with the axis of rotation of the assembly, the diameter of this inner face being between 0.995 and 0.985 times the diameter $\phi_{JS}$ of the service rim.

In order to assure perfect tightness of the adapter to the service rim, it is advantageous to provide on the radially inner face of the adapter, on the one hand, on the horizontal or inclined portion of said face and, on the other hand, on the curved portion of the same face, two zones which are provided with an elastomeric material having properties which are equivalent or very close to the properties of the tight inner rubbers used currently in tires without independent inner tube.

In order to maintain firmly in place, on the one hand, the bead of the tire on the adapter and, on the other hand, the adapter on the rim, known means can be employed, such as for instance a circumferential groove of small dimension provided in the rim and corresponding to a protrusion on the inner face of the adapter, the latter furthermore having an axially inner point in the form of a protuberance which forms a stop for the tip of the bead.

The correct placement of the adapters will advantageously be checked upon the inflation of the tire. For this purpose, the parts of the rim which are intended to be covered by the adapters will be provided with orifices of small size, which make inflation impossible if the orifices are not properly covered by the adapters Likewise, the inflating of the tire of the assembly will advantageously be effected by a valve which is integrated with the adapter, as shown in French Patent 2 257 442.

Although the rolling assembly usually employed comprises a single tire mounted on a single rim by means of two adapters, the invention applies in the same manner to an assembly of twin wheels and corresponding tires, and then makes it possible advantageously to replace the two twin rims by a single rim having, in its center, two flanges which are assembled to each other and a single disc.

The description which follows, given with reference to the accompanying illustrative drawing, will make it better understood how the invention can be reduced to practice.

DESCRIPTION OF PREFERRED EMBODIMENTS

Figure 1:
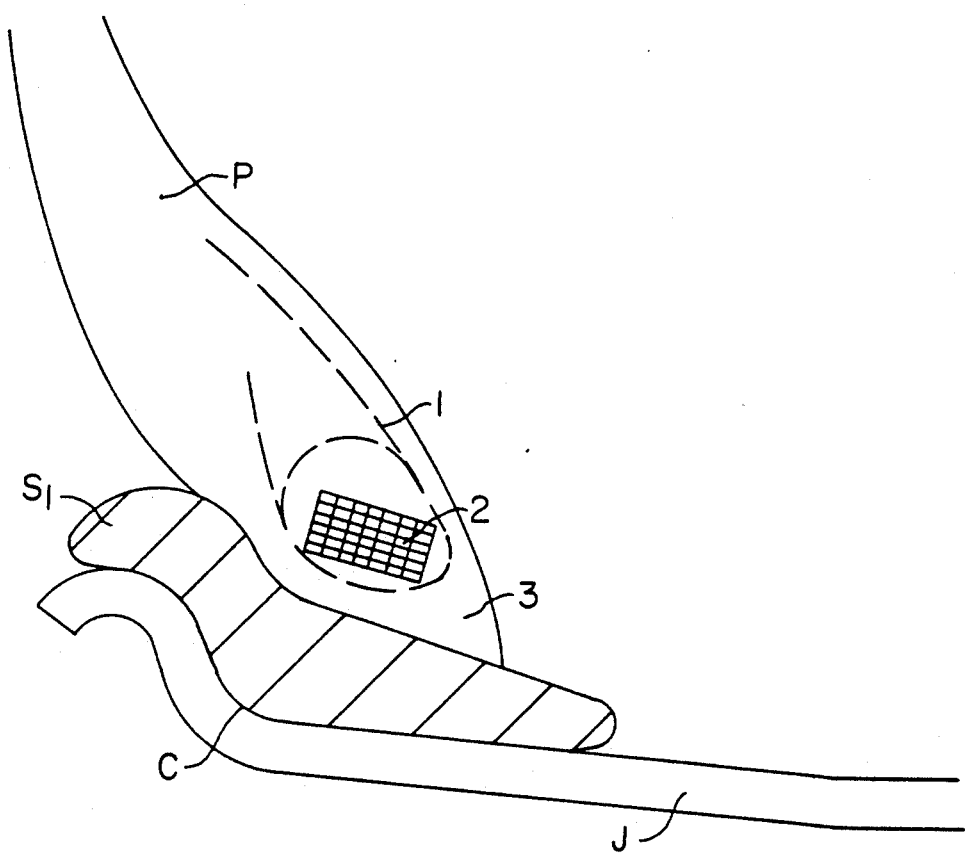
FIG. 1 shows, seen in meridian section, the rolling assembly together with the tire P, the beads of which have seats inclined more than 15°, the rim J and an adapter $S_1$, the second adapter $S_2$ being identical to $S_1$.
Figure 2A:
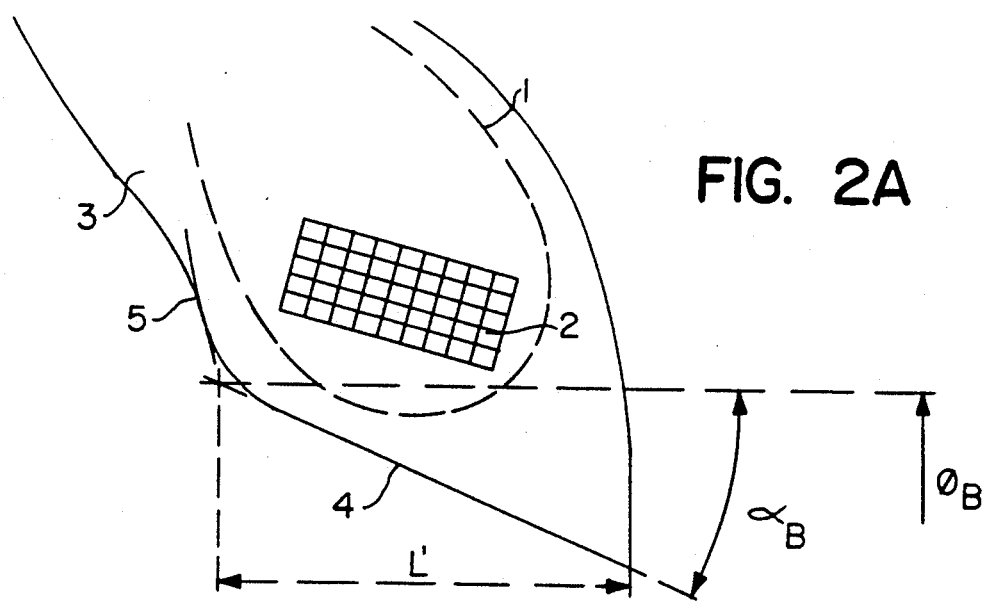
FIG. 2A is an enlarged view of the tire P as shown in FIG. 1.

The tire P is a tire with radial carcass reinforcement 1 anchored in each bead 3 to a bead ring 2 having non-extensible rectangular cords. As shown in FIG. 2A, the bead 3 has a seat 4 which is inclined by an angle $\alpha_B$ equal to 20° with respect to the axis of rotation of the rolling assembly. The diameter $\phi_B$ of the bead 3 is measured at the intersection of the generatrix 4 of the frustoconical seat and the wall 5 of the bead substantially perpendicular to the axis of rotation of the assembly; and this diameter $\phi_B$ is equal to 1 time the nominal diameter of the standard rim J' with 15° inclined seats, recommended for the mounting of the tire P.

If the tire P is a 315/80 R 22.5, the recommended rim J' is known as 22.5×900 and its standard dimensions are known for instance, from the book of "The Tire and Rim Association".

Figure 2B:
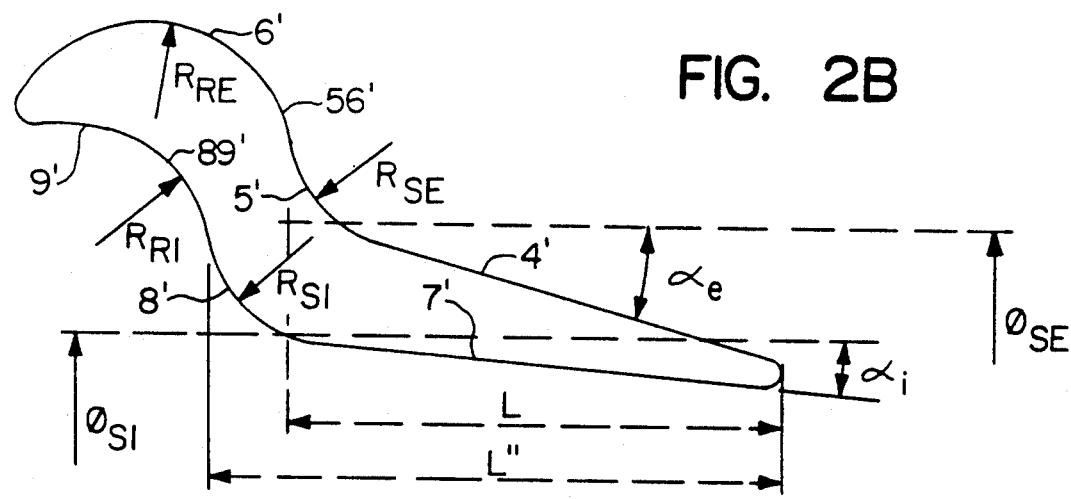
FIG. 2B is an enlarged view of the adapter $S_1$ shown in FIG. 1.

As shown in FIG. 2B, the contour or profile of the radially outer face of the adapter $S_1$ is strictly in accord with the standard data; thus the generatrix 4' of the seat of the adapter $S_1$ forms an angle $\alpha_c$ equal to 15°±1° with the axis of rotation of the rolling assembly; the diameter $\phi_{SE}$ corresponds to the nominal diameter of the corresponding rim J' and, similarly, the generatrix 4' is extended axially to the outside by a circular arc 5' of radius $R_{SE}$ equal to 8 mm, said circular arc 5' of radius $R_{SE}$ being tangent to another circular arc 6' of radius $R_{RE}$ equal to 12.7 mm, these two circular arcs forming a substantially vertical zone 56' around their point of tangency, and the contour 4', 5', 6' being identical to the contour of the standard rim J'.

As to the contour or profile of the radially inner face of the adapter $S_1$ it is formed of a part 7' which is inclined by an angle $\alpha_i$ of 5° with respect to the axis of rotation of the tire and the diameter $\phi_{SI}$ of which together with the diameter $\phi_{SE}$ determines the thickness E of the adapter. The generatrix 7' is extended axially to the outside by a circular arc 8' of radius $R_{SI}$ equal to 1.5 times $R_{SE}$, this circular arc being tangent to another circular arc 9' of radius $R_{RI}$ equal to $R_{RE}$, that is to say 12.7 mm, these two circular arcs forming, around their point of tangency, a quasivertical zone 89' parallel to the portion 56' of the radially outer face.

The axial width L of the inclined portion 4' of the radially outer face of the adapter $S_1$ is at least equal to the standard minimum width L of the 15° rim seat, and therefore greater than the axial width L' of the bead 3 of the tire P. As to the width L" of the radially inner face 7', its difference from the width L, namely L"-L, is equal to the amount W-A/2, that is to say half the difference between the width W of the service rim J and the width A of the rim J' normally used for the tire P.

It is obvious that the axially inner and outer ends of the adapter $S_1$ are in most cases in the form of roundings of small radius of curvature.

Figure 2C:
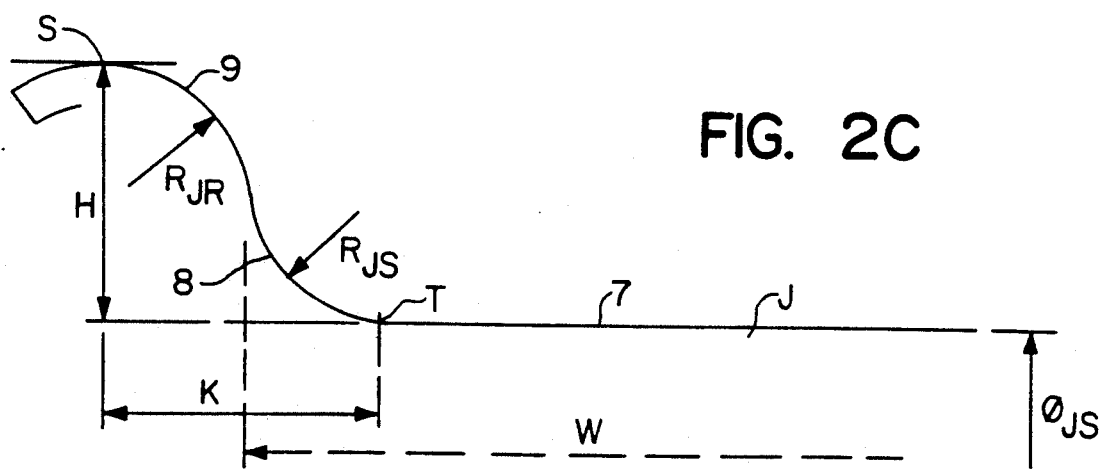
FIG. 2C is an enlarged view of the upper surface of the rim J as shown in FIG. 1.

As to the rim of FIG. 2C on which two adapters and then the tire P are mounted, its radially outer profile, seen in meridian section, is formed of a cylindrical part 7 of diameter $\phi_{JS}$ such that the diameter $\phi_{SI}$ of the inner face 7' of the adapter $S_1$ is between 0.995 and 0.985 times $\phi_{JS}$, which permits a light clamping of the adapter on the rim.

This cylindrical part 7 is extended axially to the outside by a circular arc 8 of radius $R_{JS}$ which is slightly less than the corresponding radius $R_{SI}$ of the adapter. In the case described, $R_{JS}$ is equal to 8 mm. This circular arc of radius $R_{JS}$ is extended by a circular arc 9 of radius $R_{JR}$ which circular arc represents, in meridian section, the rim flange 8, 9. This radius $R_{JR}$ is equal to the radius $R_{RI}$ and therefore to the radius $R_{RE}$ of the adapter flange.

If S is the vertex of the rim flange 8, 9, T the point of tangency between the cylindrical part 7 and the circular arc 8, and K the axial distance between the points S and T, then the diameter $\phi_{JS}$ of the cylindrical part 7 is such that $$\sqrt{(\phi_{JS} + H)^2 + K^2} < \phi_{SE}$$

in order to permit easy mounting of the tire on the rim J. In the example studied, $\phi_{JS}$ must be less than 558.45 mm and selected equal to 558 mm.

Figure 3:
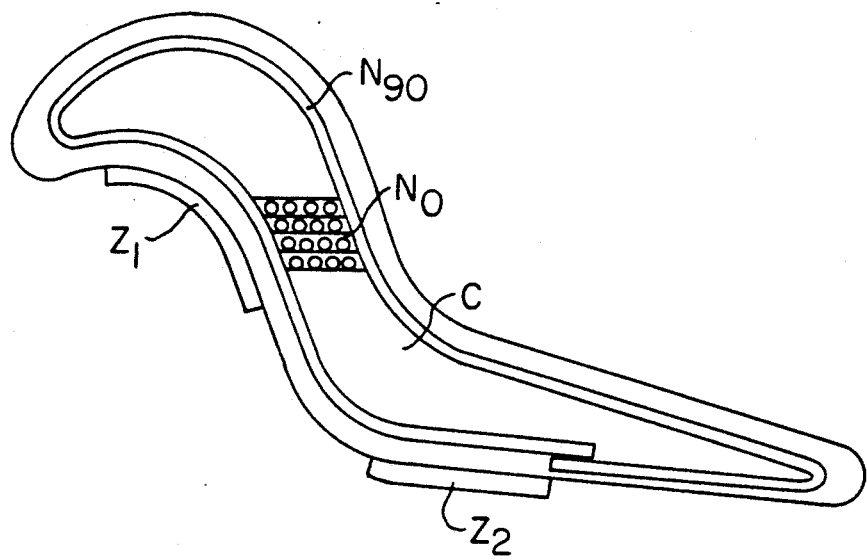
FIG. 3 shows a modified version of the adapter shown in FIGS. 1 and 2B.

The construction of the adapter $S_1$ is shown in FIG. 3. In addition to the ply $N_{90}$ of meridian cords or cables surrounding the mass of vulcanized rubber C of the adapter $S_1$ a mass $N_o$ of circumferentially arranged cords or cables reinforces the portion of the adapter $S_1$ located between the two quasi-vertical portions 56' and 89' of the adapter.

The rubber C is a normal vulcanized rubber, that is to say a mix of elastomer, carbon black and various adjuvants, in particular vulcanization adjuvants. This mix must be such that, once vulcanized, its modulus of elasticity in compression is greater than 8 MPa. In the example studied, it is equal to 17 MPa, under a relative compression $\epsilon$ equal to 10%. As known, the modulus of compression is obtained from the curve showing the uniaxial force of compression imposed upon a test specimen of cross section $S_o$ as a function of the relative compression $\epsilon$.

On the radially inner face of the adapter $S_1$ there are arranged vulcanized strips $Z_1$, $Z_2$ of rubber mix having a base of butyl elastomer, which mix is generally used to line the inside of a tubeless tire and has the property of being air-tight.

Figure 4:
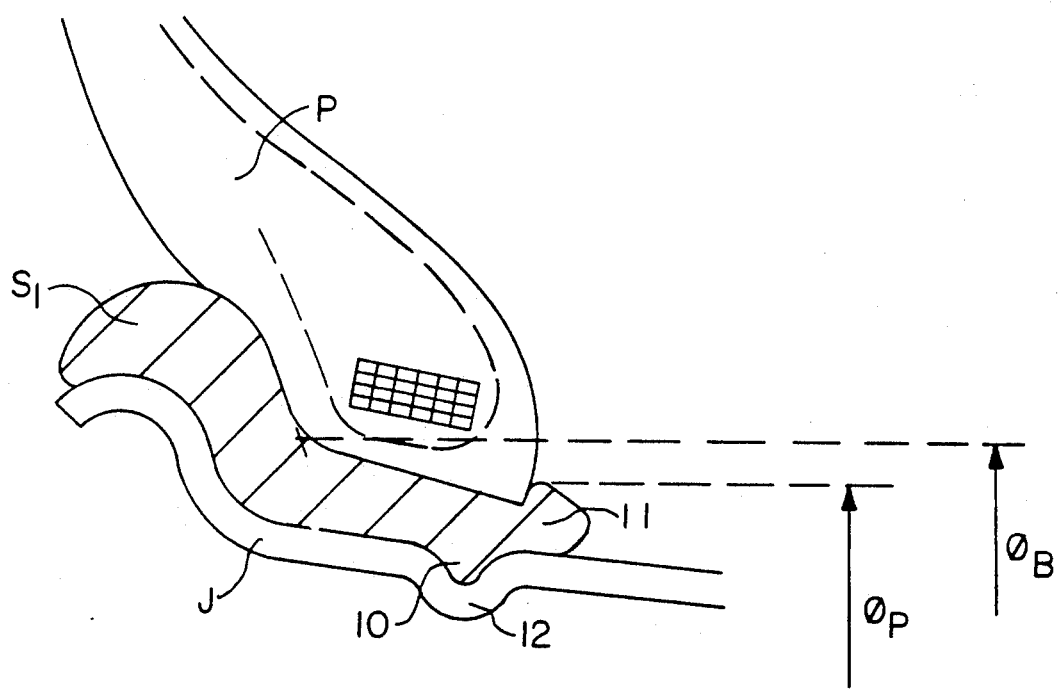
FIG. 4 is a meridian section of still another version of adapter and rim.

FIG. 4 shows an example of an adapter with circumferential protrusion 10 at the base and axially inner protuberance 11, the adapter $S_1$ being mounted on a rim J which itself has a circumferential groove 12 intended to receive the protrusion 10. The maximum diameter $\phi_P$ of the protuberance is less than the diameter $\phi_B$ of the bead of the tire P. This adapter permits better resistance of the tire to the loosening of the beads.

I claim:

1. A rolling assembly for a tire (P) having beads (3) with frustoconical bases, the tire being of standard dimensions without independent inner tube, intended to be used on a standard rim having frustoconical seats and rim flanges of a height H, comprising a service rim (J) formed primarily of two rim flanges of height H and a cylindrical rim face the diameter $\phi_{JS}$ of which is such that $$\sqrt{(\phi_{JS} + H)^2 + K^2} < \phi_{SE}$$

$\phi_{SE}$ being the nominal diameter of the standard rim normally used for the tire (P), and K being the axial distance between the vertex of the rim flange and the end of the cylindrical rim base, while the width (W) of the rim (J) is between 1.05 and 1.10 times the width of the standard rim, and annular adapters ($S_1$, $S_2$) for insertion between the beads of the tire and the rim, each adapter ($S_1$, $S_2$) having an outer contour (4', 5', 6', 7', 8', 9') adapted to the contour (7, 8, 9) of the rim (J) on which it rests and to the contour (4, 5) on the base of the bead (3) of the tire (P) and being formed of a vulcanized elastomeric material (C) of an elastic modulus in compression at least equal to 8 MPa, which material is surrounded by a reinforcement ($N_{90}$) formed of at least one ply of meridian cords or cables and reinforced by a mass ($N_o$) of nonextendable cords or cables which are arranged circumferentially, this mass ($N_o$), which is in the form of superimposed strips or "package" rings being located between the two quasi-vertical faces (56' and 89') of the adapter($S_1$, $S_2$).

2. A rolling assembly according to claim 1, including a tire (P) having beads with frustoconical bases intended to be mounted on a standard rim having frustoconical seats inclined by 15±1°.

3. An assembly according to claim 1, in which, in meridian section, the radially outer profile (4', 5', 6') of the adapter ($S_1$) is identical to the radially outer profile of the seat plus flanges part of the rim having 15° frustoconical seats on which the tire (P) is normally mounted.

4. An assembly according to claim 3, wherein, in meridian section, the radially inner profile (7', 8', 9') of the adapter is formed of a linear zone (7') forming with the axis of rotation of the assembly an angle $\alpha_i$ such that $0° \leq \alpha_i \leq 10°$ and that the diameter ($\phi_{SI}$) of the inner face is between 0.995 times and 0.985 times the diameter $\phi_{JS}$ of the cylindrical part (7) of the service rim (J).

5. An assembly according to claim 3, in which the adapter has a radially inner face and including strips ($Z_1$, $Z_2$) of gas-tight vulcanized material having a base of butyl elastomer on the radially inner face of the adapter.

6. An assembly according to claim 3, in which the adapter has a circumferential depending protrusion (10) and an axially inner protuberance (11) forming a stop for the tip of the bead (3) of the tire (P).

7. An assembly according to claim 3, including an inflation valve for the tire.

8. A rolling assembly according to claim 1, in which the parts (9, 8, 7) of the rim (J) which are to be covered by the adapters ($S_1$, $S_2$) are provided with orifices, making the inflation of the tire (P) impossible if the adapters ($S_1$, $S_2$) are not arranged correctly.

9. A rolling assembly, formed of two assemblies according to claim 1.

10. An assembly according to claim 9, wherein the flanges of two rims are connected together to form a single rim for mounting two tires which rim is fastened to the hub by a single disc.

* * * * *

UNITED STATES PATENT AND TRADEMARK OFFICE
CERTIFICATE OF CORRECTION

PATENT NO. : 5,232,034

DATED : Aug. 3, 1993

INVENTOR(S) : Gergele

It is certified that error appears in the above-identified patent and that said Letters Patent is hereby corrected as shown below:

Title page, under "FOREIGN PATENT DOCUMENTS, "2414883" should read --2514883--.

Col. 4, line 6, "$\alpha_c$" should read --$\alpha_e$--.

Signed and Sealed this

Eighth Day of March, 1994

Attest:

*Attesting Officer*

BRUCE LEHMAN

*Commissioner of Patents and Trademarks*